United States Patent Office 2,779,103
Patented Jan. 29, 1957

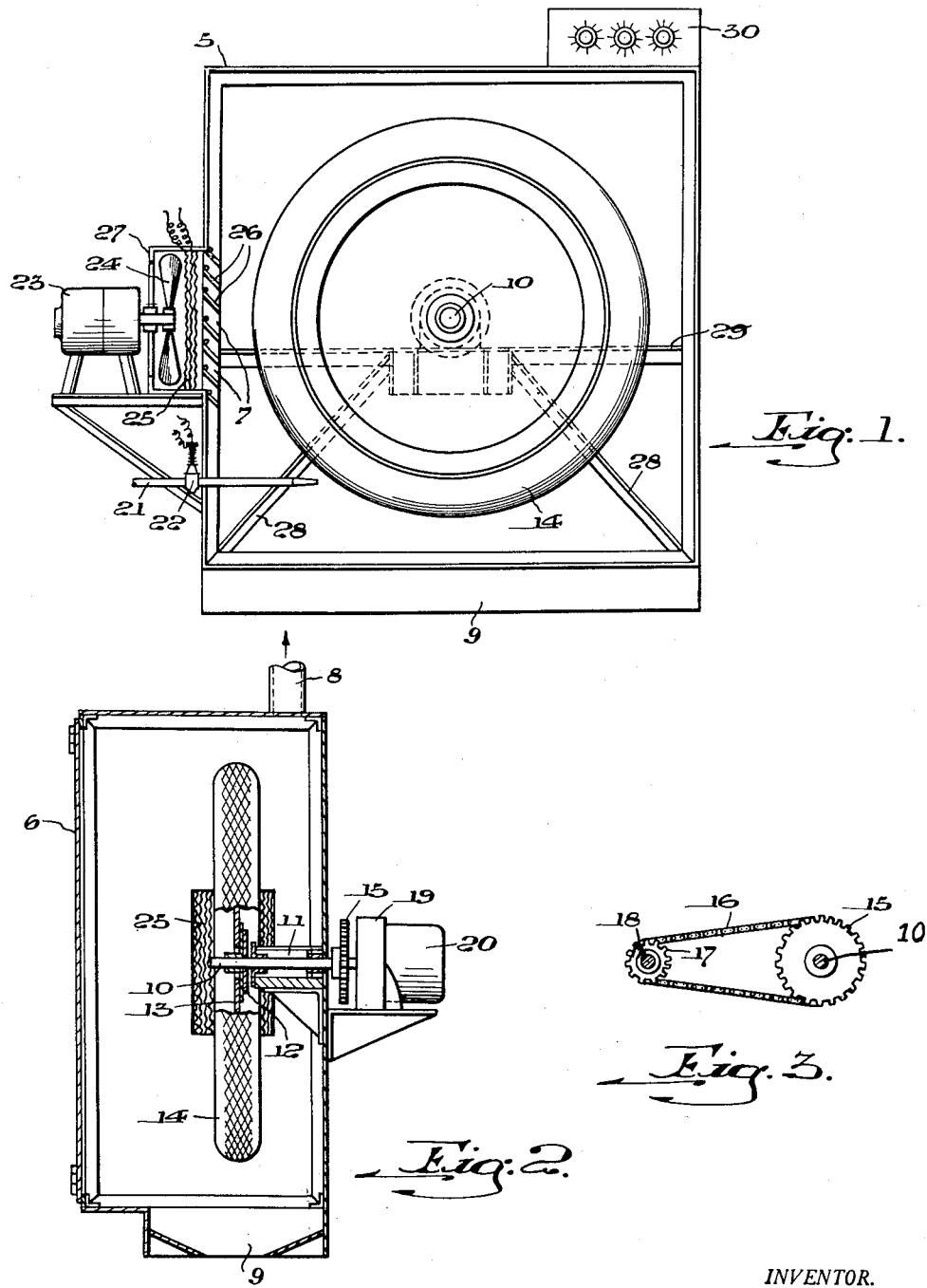

2,779,103

TIRE DEFROSTER, CLEANER, AND DRYER

Joseph A. Tomchak, McKees Rocks, Pa.

Application October 11, 1954, Serial No. 461,548

2 Claims. (Cl. 34—87)

My invention relates to defrosters and cleaners for use primarily in the thawing and cleaning of tires that are frozen upon a wheel at winter temperatures, in order to remove the tires from the wheels and prepare them to a clean and dry condition for retreading.

The invention has for its object the provision of an improved arrangement whereby tires can be quickly thawed, cleaned and dried, through the employment of a simple arrangement of apparatus that can be automatically timed to perform the various operations in proper sequence and duration.

In the accompanying drawing, Figure 1 is a side elevational view of the apparatus;

Fig. 2 is a cross sectional view thereof, and

Fig. 3 shows a portion of the driving mechanisms for rotating a tire.

The cabinet 5 is provided with a door 6 and with an air-inlet opening at 7, a vent opening at 8, and a drain at 9. A tire-supporting shaft 10 is mounted in a suitable roller or needle bearing 11 and carries a spider or bracket 12 for removably supporting a wheel disc 13 carrying the usual tire 14, it being understood that where tires and their rims are brought in in unmounted relation to a wheel body, a supporting member similar to 13 will be employed for holding the tire while it is being rotated and operated upon.

The shaft 10 has a sprocket wheel 15 mounted thereon that is driven by a chain 16 from a pinion or sprocket 17. The pinion 17 is mounted on a shaft 18 that is driven through reduction gearing at 19, by an electric motor 20. The reduction gearing and the small pinion are required so that the tire 14 will be rotated quite slowly.

During rotation of the tire, steam and air are introduced through a jet pipe 21, against the tire, the flow being controlled by a magnetically-operated valve 22. When sufficient steam has been introduced to thoroughly thaw the tire on its rim and remove foreign matter such as mud, the flow of fluid through the jet will be cut off, and a fan motor 23 started to drive a fan 24 that directs a flow of air through electrical-resistor elements 25 to heat the air. so that it will dry the tire.

The flow of heated air is past louvers 26 that are hingedly mounted at their upper edges, so that they will close under the action of gravity, when the fan 24 is stationary. The louvers are desirable, because they prevent steam or moist air from entering into the casing 27 that contains the heater coils and the fan. The drying air will be exhausted through the vent 8 while condensed steam and detritus will flow off through the drain at 9. The bearing at 11 is rigidly supported in the casing by brace members 28 and 29.

In using the apparatus, timer switches of conventional form such as those used on domestic laundry machines can be employed, mounted in a housing such as at 30. As here shown, three timing switches are employed. One of these will control the motor 20, another the electromagnet at 22, and the third, the fan motor 23. The switches will be so set that when they are all closed the motor 20 is first energized, the circuit through the solenoid will remain closed to cause a fluid pressure to be supplied through the jet 21 for a predetermined period of time when it will be automatically shut off. Thereupon, the fan motor 23 will become energized automatically and shut off after a predetermined period. Lastly, the timer switch that controls the motor 20 will interrupt the circuit through the motor.

I claim as my invention:

1. Tire defrosting and cleaning apparatus comprising a cabinet having means therein for rotatably supporting a tire, a nozzle for discharging a fluid-pressure jet into the cabinet and against the tread and sides of a tire, means for directing a current of heated drying air through an opening into the cabinet against the tread of the tire, means for rotating the tire, and means for automatically closing the said opening when flow of heated air is stopped.

2. A structure as recited in claim 1, wherein the said means for automatically closing the opening comprises shutters that close under gravity when no blast of fluid pressure is directed against them from the outside of the cabinet.

References Cited in the file of this patent

UNITED STATES PATENTS

| | | |
|---|---|---|
| 1,482,398 | Ilg | Feb. 5, 1924 |
| 1,539,779 | Selph | May 26, 1925 |
| 1,546,974 | Faber | July 21, 1925 |
| 1,751,023 | Aune | Mar. 18, 1930 |
| 2,235,559 | Mayer | Mar. 18, 1941 |
| 2,643,465 | Douglass | June 30, 1953 |
| 2,645,032 | Hammell | July 14, 1953 |